United States Patent
Naka et al.

(10) Patent No.: US 9,357,575 B2
(45) Date of Patent: May 31, 2016

(54) WIRELESS COMMUNICATION DEVICE, WIRELESS COMMUNICATION METHOD, AND WIRELESS COMMUNICATION CONTROL PROGRAM

(71) Applicant: Panasonic Corporation, Osaka (JP)

(72) Inventors: Ken Naka, Toyko (JP); Yoshio Urabe, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/421,775

(22) PCT Filed: Apr. 28, 2014

(86) PCT No.: PCT/JP2014/002367
§ 371 (c)(1),
(2) Date: Feb. 13, 2015

(87) PCT Pub. No.: WO2014/203441
PCT Pub. Date: Dec. 24, 2014

(65) Prior Publication Data
US 2015/0215980 A1   Jul. 30, 2015

(30) Foreign Application Priority Data

Jun. 18, 2013   (JP) ................................ 2013-127592

(51) Int. Cl.
*H04W 76/02*   (2009.01)
*H04W 8/22*    (2009.01)
(Continued)

(52) U.S. Cl.
CPC ............ *H04W 76/023* (2013.01); *H04W 8/005* (2013.01); *H04W 8/22* (2013.01); *H04W 12/06* (2013.01); *H04W 84/12* (2013.01)

(58) Field of Classification Search
None
See application file for complete search history.

(56) References Cited

U.S. PATENT DOCUMENTS 8,036,639 B2    10/2011  Carter et al.
8,270,414 B2 *   9/2012  Oi et al. ................... 370/400
(Continued)

FOREIGN PATENT DOCUMENTS

JP    2010-068021 A    3/2010
JP    2010-258619 A    11/2010
(Continued)

OTHER PUBLICATIONS

IEEE Standards Association, IEEE Std 802.11ad-2012, "Part 11: Wireless LAN Medium Access Control (MAC) and Physical Layer (PHY) Specifications," Amendment 3: Enhancements for Very High Throughput in the 60 GHz Band, IEEE Standard for Information technology—Telecommunications and information exchange between systems—Local and metropolitan area networks—Specific requirements, IEEE Computer Society, Dec. 28, 2012, 31 pages.

(Continued)

*Primary Examiner* — Christine Duong
(74) *Attorney, Agent, or Firm* — Seed IP Law Group PLLC

(57) ABSTRACT

Wireless communication apparatus 100 is disclosed that can make appropriate connections taken the wireless communication capability of the wireless communication apparatus into consideration in WiGig communication. Wireless communication apparatus 100 (first wireless communication apparatus) that performs communication using WiGig includes: storage section 13 that stores capability information indicating wireless communication capability of the first wireless communication apparatus 100; capability information acquiring section 143 that acquires capability information of a second wireless communication apparatus which is a connection peer of the first wireless communication apparatus from the second wireless communication apparatus; and connection method determining section 145 that determines a role of each of first wireless communication apparatus 100 and the second wireless communication apparatus when the first and the second wireless communication apparatuses are connected, based on the capability information of first wireless communication apparatus 100 and the second wireless communication apparatus.

2 Claims, 6 Drawing Sheets

(51) Int. Cl.
*H04W 8/00* (2009.01)
*H04W 84/12* (2009.01)
*H04W 12/06* (2009.01)

(56) References Cited

U.S. PATENT DOCUMENTS

| | | |
|---|---|---|
| 8,619,581 B2 | 12/2013 | Trainin et al. |
| 8,767,690 B2 | 7/2014 | Itoh et al. |
| 2010/0061355 A1 | 3/2010 | Tsuchiya |
| 2010/0272083 A1 | 10/2010 | Itoh et al. |
| 2010/0312849 A1 | 12/2010 | Miyabayashi et al. |
| 2011/0149816 A1 | 6/2011 | Saito et al. |
| 2012/0177016 A1 | 7/2012 | Trainin et al. |
| 2013/0329712 A1* | 12/2013 | Cordeiro et al. .............. 370/338 |
| 2014/0078928 A1* | 3/2014 | Verma et al. .................. 370/254 |
| 2014/0082163 A1 | 3/2014 | Senga et al. |
| 2014/0248866 A1 | 9/2014 | Itoh et al. |
| 2015/0079939 A1* | 3/2015 | Naka ..................... H04W 12/04 455/411 |

FOREIGN PATENT DOCUMENTS

| | | |
|---|---|---|
| JP | 2010-287964 A | 12/2010 |
| JP | 2011-135166 A | 7/2011 |
| JP | 2012-147429 A | 8/2012 |
| WO | 2005/034434 A1 | 4/2005 |
| WO | 2013/014834 A1 | 1/2013 |

OTHER PUBLICATIONS

International Search Report dated Jul. 1, 2014, for corresponding Application No. PCT/JP2014/002367, 4 pages.
Solomon Trainin, Carlos Cordeiro, "D1.0 Comment resolution part 3," IEEE 802.11-11/0070r0, Jan. 2011, 6 pages.

* cited by examiner

131,231,331

| APPARATUS INFORMATION | |
|---|---|
| MULTIROLE | ENABLED OR DISABLED |
| CONNECTION METHOD | PCP-STA, STA-STA |

| USAGE INFORMATION | |
|---|---|
| CONNECTED COMMUNICATION CHANNEL | APPARATUS 100 – APPARATUS 200 |
| USAGE | IN USE OR NOT IN USE |

*FIG. 2B*

WIRELESS COMMUNICATION DEVICE, WIRELESS COMMUNICATION METHOD, AND WIRELESS COMMUNICATION CONTROL PROGRAM

TECHNICAL FIELD

The present disclosure relates to a wireless communication apparatus, a wireless communication method, and a wireless communication control program that carry out wireless communication with another wireless communication apparatus.

BACKGROUND ART

Conventionally, when a wireless communication apparatus performs communication using Wi-Fi with another wireless communication apparatus (hereinafter referred to as "Wi-Fi communication"), the wireless communication apparatus performs authentication based on an authentication key which has been exchanged in advance. For example, PTL 1 discloses WPA (Wi-Fi Protected Access) carried out between a station (hereinafter referred to as "STA") and an access point (hereinafter referred to as "AP"). "STA" and "AP" are roles of wireless communication apparatuses.

This WPA is also applicable to WiGig (Wireless Gigabit), which is the standard of wireless communication described in NPL 1. That is, a wireless communication apparatus executes WPA with another wireless communication apparatus and can thereby perform communication using WiGig (hereinafter referred to as "WiGig communication"). By using a wireless wave band of 60 GHz which belongs to millimeter waves, WiGig communication can transmit/receive a greater amount of data faster than Wi-Fi communication.

WiGig has the following features. In WiGig, the role of a wireless communication apparatus is "STA" and "PCP (Personal basic service set Central Point)" which is similar to the role of AP, but these are not fixed unlike Wi-Fi. Furthermore, the wireless communication apparatus can perform operations in a plurality of roles simultaneously (hereinafter referred to as "multirole"). In WiGig, STAs connected to the same PCP can also be directly connected to each other (hereinafter referred to as "STA-STA connection"). "Multirole" and "STA-STA connection" are examples of wireless communication capability held by wireless communication apparatuses.

CITATION LIST

Patent Literature

PTL 1
US Patent Publication No. 8036639 Specification

Non-Patent Literature

NPL 1
IEEE Std 802.11ad-2012

SUMMARY OF INVENTION

Technical Problem

However, WPA is an authentication method for connecting PCP and STA. For this reason, when WPA is applied to WiGig, there is a problem that although wireless communication apparatuses have the aforementioned wireless communication capability (e.g., multirole, STA-STA connection), these are always connected as a PCP and STA.

An object of the present disclosure is to provide a wireless communication apparatus, a wireless communication method, and a wireless communication control program capable of making appropriate connections taken the wireless communication capability of the wireless communication apparatus into consideration in WiGig communication.

Solution to Problem

A wireless communication apparatus according to an aspect of the present disclosure is a wireless communication apparatus that performs communication using WiGig, the wireless communication apparatus including: a storage section that stores capability information indicating wireless communication capability of the wireless communication apparatus which is referred to as a first wireless communication apparatus; a capability information acquiring section that acquires capability information of a second wireless communication apparatus which is a connection peer of the first wireless communication apparatus from the second wireless communication apparatus; and a connection method determining section that determines a role of each of the first and the second wireless communication apparatuses when the first and the second wireless communication apparatuses are connected, based on the capability information of the first wireless communication apparatus and the capability information of the second wireless communication apparatus.

A wireless communication method according to an aspect of the present disclosure is a method of performing communication using WiGig, the method including: storing capability information indicating wireless communication capability of a wireless communication apparatus which is referred to as a first wireless communication apparatus; acquiring capability information of a second wireless communication apparatus which is a connection peer of the first wireless communication apparatus from the second wireless communication apparatus; and determining a role of each of the first and the second wireless communication apparatuses when the first and the second wireless communication apparatuses are connected, based on the capability information of the first wireless communication apparatus and the capability information of the second wireless communication apparatus.

A wireless communication control program according to an aspect of the present disclosure is a program that causes a computer of an apparatus that performs communication using WiGig to execute processing including: storing capability information indicating wireless communication capability of a wireless communication apparatus which is referred to as a first wireless communication apparatus; acquiring capability information of a second wireless communication apparatus which is a connection peer of the first wireless communication apparatus from the second wireless communication apparatus; and determining a role of each of the first and the second wireless communication apparatuses when the first and the second wireless communication apparatuses are connected, based on the capability information of the first wireless communication apparatus and the capability information of the second wireless communication apparatus.

Advantageous Effects of Invention

The present disclosure can make appropriate connections taken the wireless communication capability of the wireless communication apparatus into consideration in WiGig communication.

BRIEF DESCRIPTION OF DRAWINGS

FIGS. 2A and 2B are diagrams illustrating a configuration example of apparatus information and usage information handled by the wireless communication apparatus according to the present embodiment;

DESCRIPTION OF EMBODIMENT

Hereinafter, an embodiment of the present disclosure will be described in detail with reference to the accompanying drawings.

<Configuration of Wireless Communication Apparatus 100>

Figure 1:
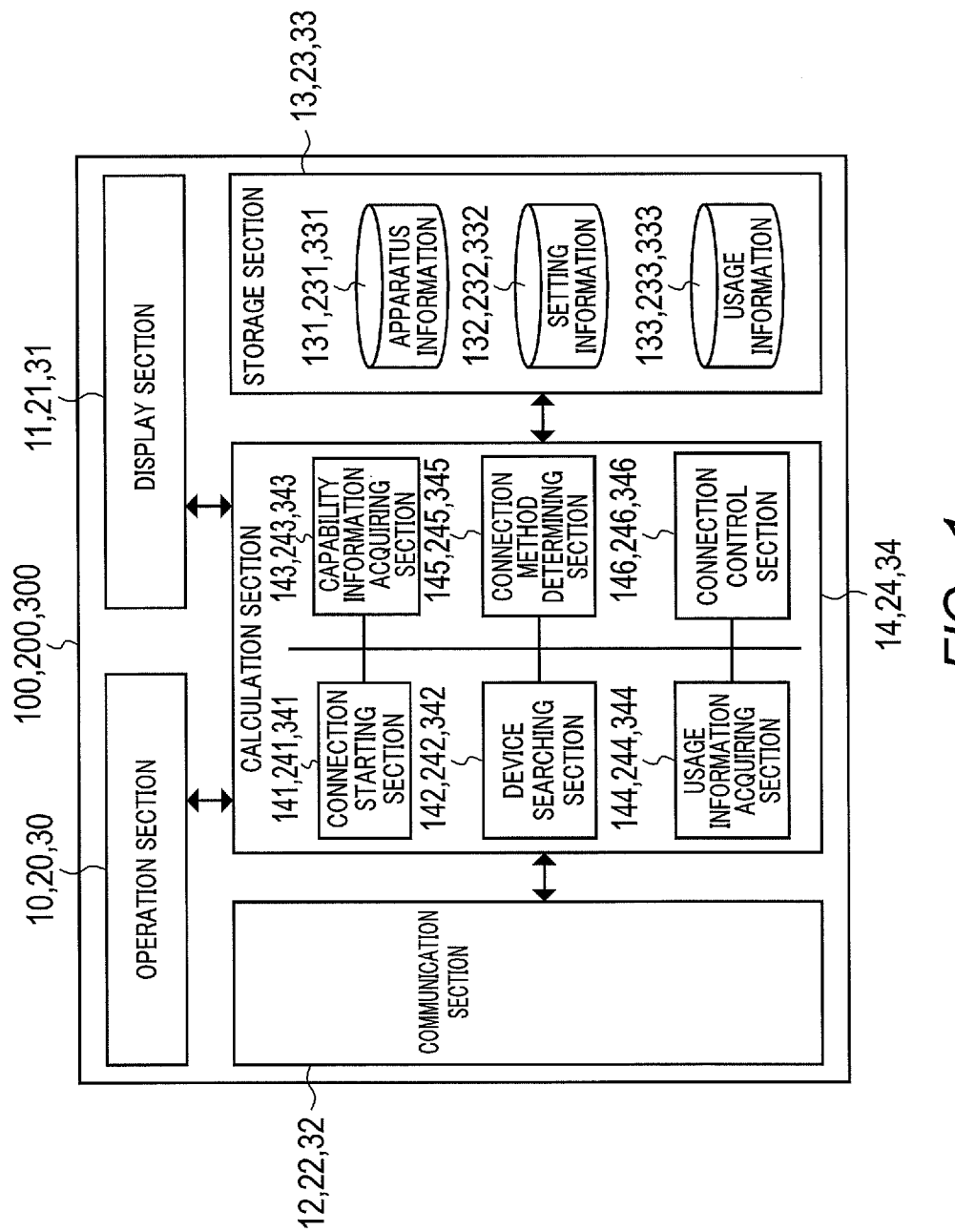
FIG. 1 is a block diagram illustrating a configuration example of a wireless communication apparatus according to an embodiment.

First, a configuration example of a wireless communication apparatus according to an embodiment of the present disclosure will be described with reference to FIG. 1. FIG. 1 is a diagram illustrating a configuration example of wireless communication apparatus 100 according to the present embodiment.

In FIG. 1, wireless communication apparatus 100 includes operation section 10, display section 11, communication section 12, storage section 13 and calculation section 14.

Operation section 10 is an input device that receives a user operation on a keyboard, a mouse, a button of hardware, a touch panel or the like.

Display section 11 is, for example, a display device such as a liquid crystal display.

Communication section 12 is an interface for realizing WiGig communication between wireless communication apparatus 100 and another wireless communication apparatus (e.g., wireless communication apparatus 200 which will be described later). In addition, communication section 12 is also an interface for realizing WPA (also including WPA2) between wireless communication apparatus 100 and the other wireless communication apparatus. WPA2 is a standard of a wireless LAN encryption scheme defined by Wi-Fi Alliance and corresponds to stronger encryption than WPA.

Storage section 13 is a non-volatile storage medium such as an HDD (Hard Disc Drive), SSD (Solid State Drive) or flash memory. Storage section 13 stores software such as operating system and application, and various types of information as parameters. The above software is loaded into a working memory of calculation section 14 and started and operated by being subjected to calculation processing by a CPU (Central Processing Unit).

Storage section 13 stores apparatus information 131, setting information 132 and usage information 133.

Apparatus information 131 includes specific information that can identify wireless communication apparatus 100 (hereinafter referred to as "identification information") and information indicating wireless communication capability of wireless communication apparatus 100 (hereinafter referred to as "capability information"). The identification information is, for example, a MAC address or SSID. The capability information is, for example, capability information defined in WiGig.

Apparatus information 131 is created by a user starting a wireless setting application and inputting a value for each parameter, and is saved in storage section 13. Alternatively, apparatus information 131 is saved in storage section 13 by installing software such as a driver of a wireless device or middleware.

Here, an example of capability information included in apparatus information 131 will be described. FIG. 2A is a diagram illustrating an example of capability information included in apparatus information 131. In FIG. 2A, identification information of wireless communication apparatus 100 is omitted. As shown in FIG. 2A, the capability information includes two parameters called "multirole" and "connection method."

The "multirole" describes whether or not wireless communication apparatus 100 is multirole-enabled (can operate in a plurality of roles simultaneously). That is, "Enabled" is described in "multirole" when wireless communication apparatus 100 is multirole-enabled and "Disabled" is described in "multirole" when wireless communication apparatus 100 is multirole-disabled.

The "connection method" describes a method of connection available to wireless communication apparatus 100. That is, when wireless communication apparatus 100 can make a PCP and STA connection (hereinafter referred to as "PCP-STA connection"), "PCP-STA" is described in "connection method." On the other hand, when wireless communication apparatus 100 can make a STA-STA connection, "STA-STA" is described in "connection method." In the example in FIG. 2A, "PCP-STA" and "STA-STA" are described, and so wireless communication apparatus 100 can make both PCP-STA connection and STA-STA connection.

Setting information 132 is information on an authentication key for executing WPA. This setting information 132 is created by executing WPS (Wi-Fi Protected Setup) in the process of connection between wireless communication apparatus 100 and the other wireless communication apparatus, for example. The various parameters included in the setting information are well-known, and therefore description thereof will be omitted.

Usage information 133 is information relating to a communication channel (link) established between wireless communication apparatus 100 and the other wireless communication apparatus. This usage information 133 is generated and saved in storage section 13 when wireless communication apparatus 100 is connected to the other wireless communication apparatus. Even after the connection, usage information 133 is updated by determining whether or not data communication is performed for a certain period. At this time, wireless communication apparatus 100 and the other wireless communication apparatus share usage information of the same contents. On the other hand, when wireless communication apparatus 100 is not connected to the other wireless communication apparatus at all, no usage information 133 exists in storage section 13 because no usage information is generated.

Here, an example of usage information 133 will be described. FIG. 2B is a diagram illustrating an example of usage information 133. As shown in FIG. 2B, usage information 133 includes two parameters of "connected communication channel" and "usage."

"Connected communication channel" describes an already connected communication channel (hereinafter referred to as "connected communication channel"). In the example in FIG. 2B, "apparatus 100—apparatus 200" is described assuming that wireless communication apparatus 100 and wireless communication apparatus 200 (an example of the other wireless communication apparatus, details of which will be described later) are already connected.

"Usage" describes whether or not the connected communication channel is in use. That is, when the connected communication channel is in use, "In use" is described in "usage" and when the connected communication channel is not in use, "Not in use" is described in "usage." Note that the "connected communication channel is in use" refers to a state in which the connected communication channel is used for transmission/reception of data (e.g., file transfer or video streaming).

Calculation section 14 is constructed of, for example, a power supply, motherboard, CPU, recording medium such as ROM (Read Only Memory) storing a control program and working memory such as RAM (Random Access Memory) or the like.

Calculation section 14 includes connection starting section 141, device searching section 142, capability information acquiring section 143, usage information acquiring section 144, connection method determining section 145 and connection control section 146. Functions of the sections are realized by the CPU executing a control program. Details of the sections will be described later.

Note that calculation section 14 may also be constructed of an integrated circuit integrated on one semiconductor chip as SoC (System on a Chip). In such a case, the sections of calculation section 14 may be individual chips or a plurality of sections may be contained on a single chip. "LSI (Large Scale Integration)," "IC (Integrated Circuit)," "system LSI," "super LSI," or "ultra LSI" may be adopted depending on differing extents of integration. Further, the integrated circuit integration may be implemented using dedicated circuitry or general purpose processors. The integrated circuit may be a programmable FPGA (Field Programmable Gate Array) or a reconfigurable processor where connections and settings of internal circuit cells can be reconfigured. Furthermore, the respective sections of calculation section 14 may be implemented by integration using other integrated circuit technology (e.g., biotechnology) that comes out to replace LSI's as a result of the advancement of semiconductor technology or a derivative other technology.

Hereinafter, the sections provided for calculation section 14 will be described.

When operation section 10 receives a connection start request operation, connection starting section 141 reads apparatus information 131 and setting information 132 from storage section 13. Connection starting section 141 outputs apparatus information 131 to device searching section 142 and outputs setting information 132 to connection control section 146. The "connection start request operation" is an operation of requesting to start a connection with the other wireless communication apparatus. The "connection" referred to here is a connection that allows wireless communication apparatus 100 and the other wireless communication apparatus to communicate with each other using WiGig.

Upon receiving apparatus information 131 from connection starting section 141, device searching section 142 starts searching for other wireless communication apparatuses (also referred to as "device") located in the periphery.

That is, device searching section 142 generates frames including identification information of wireless communication apparatus 100 included in apparatus information 131. The "frame" referred to here is a search beacon, Probe Request (an example of search signal), for example.

Next, device searching section 142 transmits the generated search beacon or Probe Request to the other wireless communication apparatus(es) via communication section 12. Device searching section 142 also receives the search beacon or Probe Response generated by the other wireless communication apparatus(es) via communication section 12. The search beacon or Probe Response received by device searching section 142 includes identification information of wireless communication apparatus 200.

Upon succeeding in a search for the other wireless communication apparatus, device searching section 142 transmits a start indication to the wireless communication apparatus (hereinafter referred to as "found apparatus") via communication section 12. The "start indication" is information for reporting information indicating that a determination on the connection method will be started from now to the other wireless communication apparatus. For example, Probe Request is used for transmission of the start indication. Information Request and Information Response may also be used instead of Probe, and the same shall apply hereinafter.

Upon receiving the start indication from a found apparatus, device searching section 142 sends back a response message in response thereto. For example, Probe Response is used to transmit this response message. After that, device searching section 142 confirms whether or not wireless communication apparatus 100 has already been connected to other wireless communication apparatuses other than the found apparatus based on usage information 133 of storage section 13. When the confirmation result shows that there is a connected wireless communication apparatus (hereinafter referred to as "connected apparatus"), device searching section 142 transmits a start indication to the connected apparatus via communication section 12.

Note that when the aforementioned search is not carried out and when a start indication is also received from the connected apparatus, device searching section 142 sends back a response message.

Upon receiving the start indication from the other wireless communication apparatus (one of found apparatuses and connected apparatuses), device searching section 142 outputs a capability information acquiring instruction to capability information acquiring section 143. The capability information acquiring instruction is information for instructing capability information acquiring section 143 to acquire capability information of the other wireless communication apparatus.

After receiving the capability information acquiring instruction from device searching section 142, capability information acquiring section 143 transmits a capability information request to the other wireless communication apparatus (found apparatus and/or connected apparatus) via communication section 12. The capability information request is information for requesting capability information of the other wireless communication apparatus. Probe Request is used to transmit the capability information request, for example.

Upon receiving the capability information request from the found apparatus, capability information acquiring section 143 reads apparatus information 131 from storage section 13, extracts capability information and transmits the capability information to the found apparatus. When there is any apparatus connected to wireless communication apparatus 100, capability information acquiring section 143 acquires capability information of the connected apparatus from the connected apparatus and transmits the capability information to the found apparatus. Probe Response is used to transmit the capability information, for example.

Upon receiving the capability information request from the connected apparatus, capability information acquiring section 143 reads apparatus information 131 from storage section 13, extracts capability information and transmits the capability information to the connected apparatus. Furthermore, when there is any found apparatus connected to wireless communication apparatus 100, capability information acquiring section 143 acquires capability information of the found apparatus from the found apparatus and transmits the capability information to the connected apparatus. Probe Response is used to transmit the capability information, for example.

Upon receiving (acquiring) the capability information from the destination of the capability information request via communication section 12, capability information acquiring section 143 outputs the received capability information and the extracted capability information to connection method determining section 145. The "received capability information" referred to here will be called "acquired capability information" hereinafter. The "extracted capability information" referred to here will be called "held capability information" hereinafter. The acquired capability information is capability information of other wireless communication apparatuses (found apparatuses and connected apparatuses). The held capability information is capability information of wireless communication apparatus 100.

Next, capability information acquiring section 143 outputs a usage information acquiring instruction to usage information acquiring section 144. The usage information acquiring instruction is information for instructing usage information acquiring section 144 to acquire usage information of another wireless communication apparatus.

Upon receiving the usage information acquiring instruction from capability information acquiring section 143, usage information acquiring section 144 transmits a usage information request to another wireless communication apparatus (found apparatus) via communication section 12. The usage information request is information for requesting usage information of another wireless communication apparatus. Probe Response is used to transmit the usage information, for example. Since wireless communication apparatus 100 and the connected apparatuses share usage information of the same contents, usage information acquiring section 144 transmits no usage information request to the connected apparatuses of wireless communication apparatus 100.

Upon receiving a usage information request from the found apparatus, usage information acquiring section 144 confirms whether or not usage information 133 is saved in storage section 13.

When the above confirmation result shows that usage information 133 is saved, usage information acquiring section 144 reads usage information 133 and transmits it to the found apparatus. Probe Response is used to transmit the usage information, for example.

On the other hand, when the above confirmation result shows that usage information 133 is not saved, usage information acquiring section 144 generates a response message indicating that there is no usage information and transmits the response message to the found apparatus. Probe Response is used to transmit the response message, for example.

Upon receiving the usage information from the destination of the usage information request via communication section 12, usage information acquiring section 144 outputs the usage information to connection method determining section 145. The "received usage information" referred to here will be called "acquired usage information" hereinafter. The acquired usage information is usage information of another wireless communication apparatus (found apparatus).

After reading usage information 133 from storage section 13, usage information acquiring section 144 outputs usage information 133 to connection method determining section 145. The "read usage information" referred to here will be called "held usage information" hereinafter. The held usage information is usage information of wireless communication apparatus 100.

Usage information acquiring section 144 outputs a connection method determination instruction to connection method determining section 145. The "connection method determination instruction" is information for instructing connection method determining section 145 to determine a method of connecting between wireless communication apparatus 100 and the other wireless communication apparatus (found apparatus and connected apparatus).

Upon receiving the connection method determination instruction from usage information acquiring section 144, connection method determining section 145 determines the connection method. The connection method is determined based on the capability information (held capability information and acquired capability information) from capability information acquiring section 143 and the usage information (held usage information and acquired usage information) from usage information acquiring section 144. In the determination of the connection method, it is determined in what roles wireless communication apparatus 100 and the other wireless communication apparatus are connected respectively. Specific examples of determination of the connection method will be described later.

Connection method determining section 145 generates information indicating connection method determination results (hereinafter referred to as "connection method information") and transmits the connection method information to the other wireless communication apparatus (found apparatus and/or connected apparatus) via communication section 12. The connection method information is information indicating in what roles wireless communication apparatus 100 and the other wireless communication apparatus are connected respectively. Probe Request is used to transmit the connection method information, for example.

Connection method determining section 145 receives the connection method information from the other wireless communication apparatus (found apparatus and/or connected apparatus) via communication section 12. Connection method determining section 145 confirms whether or not the received connection method information (hereinafter referred to as "acquired connection method information") matches the connection method information generated by wireless communication apparatus 100 itself (hereinafter referred to as "generated connection method information").

When the above confirmation result shows that the acquired connection method information matches the generated connection method information, connection method determining section 145 transmits match information indicating the match to the sender of the connection method information via communication section 12. Probe Response is used to transmit the match information, for example.

On the other hand, when the above confirmation result shows that the acquired connection method information does not match the generated connection method information, connection method determining section 145 transmits mismatch information indicating the mismatch to the sender of the connection method information via communication section 12. Probe Response is used to transmit this mismatch information, for example.

Upon receiving the match information from the other wireless communication apparatus via communication section 12, connection method determining section 145 outputs the generated connection method information and a connection control instruction to connection control section 146.

On the other hand, upon receiving the mismatch information from the other wireless communication apparatus via communication section 12, connection method determining section 145 does not output any generated connection method information and connection control instruction and outputs, for example, information indicating that the wireless communication apparatus cannot be connected to the other wireless communication apparatus to display section 11. In this way, information indicating that wireless communication apparatus 100 cannot be connected to the other wireless communication apparatus is displayed on display section 11.

Upon receiving the connection control instruction from connection method determining section 145, connection control section 146 communicates with the other wireless communication apparatus via communication section 12 to realize the connection indicated by the generated connection method information from connection method determining section 145. That is, connection control section 146 executes WPA using setting information 132 from device searching section 142 and thereby connects wireless communication apparatus 100 with the other wireless communication apparatus. Note that WPA using setting information 132 is well-known, and therefore description thereof will be omitted.

The sections provided for calculation section 14 have been described so far.

<Configuration of Other Wireless Communication Apparatuses>

Hereinafter, the other wireless communication apparatuses that carry out WiGig communication with wireless communication apparatus 100 will be referred to as "wireless communication apparatus 200" and "wireless communication apparatus 300." Wireless communication apparatuses 200 and 300 each have the same configuration as that of wireless communication apparatus 100 shown in FIG. 1. That is, as shown in FIG. 1, wireless communication apparatus 200 includes operation section 20, display section 21, communication section 22, storage section 23 and calculation section 24, and wireless communication apparatus 300 includes operation section 30, display section 31, communication section 32, storage section 33 and calculation section 34. These functional sections have the same functions as those of operation section 10, display section 11, communication section 12, storage section 13 and calculation section 14 in wireless communication apparatus 100 in that order.

As the same configurations of the respective functional sections included in calculation section 14, calculation section 24 includes connection starting section 241, device searching section 242, capability information acquiring section 243, usage information acquiring section 244, connection method determining section 245 and connection control section 246. Similarly, as the same configurations of the respective functional sections of calculation section 14, calculation section 34 also includes connection starting section 341, device searching section 342, capability information acquiring section 343, usage information acquiring section 344, connection method determining section 345 and connection control section 346.

Storage section 23 includes apparatus information 231, setting information 232, and usage information 233 as information similar to the information held by storage section 13. Similarly, storage section 33 also includes apparatus information 331, setting information 332, and usage information 333 as information similar to the information held by storage section 13.

Wireless communication apparatuses 100, 200 and 300 may be applied to a smartphone, tablet, personal computer, blu-ray disk recorder, television, game machine, music player, dongle, access point, router or the like. Note that the dongle is a device attachable/detachable to/from a predetermined apparatus via an interface such as USB (Universal Serial Bus), HDMI (High-Definition Multimedia Interface) (registered trademark) or MHL (Mobile High-definition Link).

Suppose wireless communication apparatuses 100, 200 and 300 can carry out WiGig communication with each other. Wireless communication apparatuses 100, 200 and 300 are a configuration example of a communication system of the present embodiment.

<Operation of Communication System>

Figure 3:
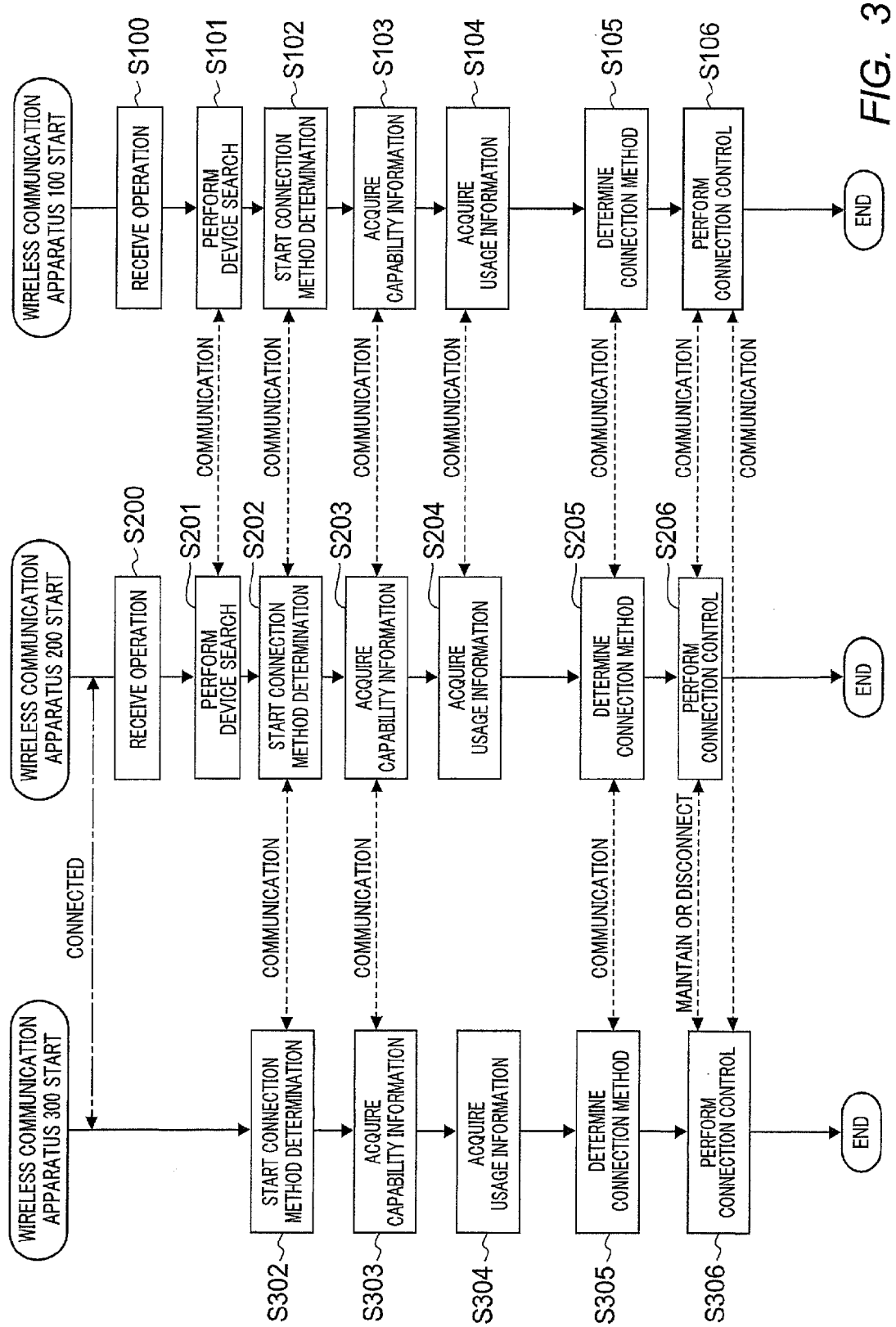
FIG. 3 is a sequence chart illustrating an operation example of a communication system according to the present embodiment.

Hereinafter, an operation example of connection processing carried out by the communication system according to the present embodiment will be described using FIG. 3. FIG. 3 is a sequence chart illustrating an example of operation of connection processing carried out by the communication system according to the present embodiment.

The connection processing which will be described below is performed in the following cases. That is, the connection processing is carried out when data such as moving images or still images are transmitted/received through WiGig communication among three wireless communication apparatuses held by three users, for example. Alternatively, the connection processing is carried out when data such as moving images or still images is transmitted/received, for example, between a television in a home and a smartphone through WiGig communication.

Figure 4:
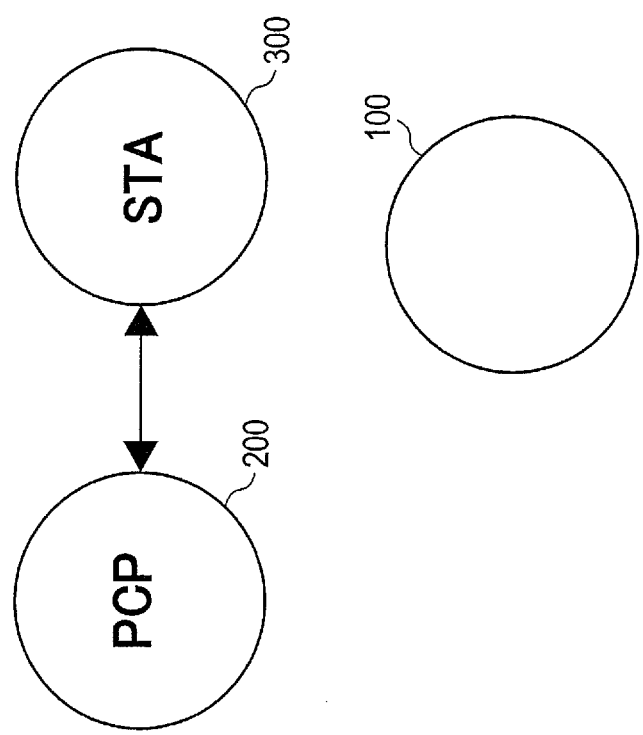
FIG. 4 is a diagram illustrating an example of a connection pattern of the wireless communication apparatus according to the present embodiment.

The connection processing in FIG. 3 described below is performed when the communication system is in a condition as shown in FIG. 4. That is, FIG. 4 illustrates a condition in which wireless communication apparatus 200 which is a PCP and wireless communication apparatus 300 which is an STA are connected together and wireless communication apparatus 100 is connected to neither wireless communication apparatus 200 nor 300. In this condition, suppose that the operation in FIG. 3 is performed for the purpose of connecting wireless communication apparatus 100, wireless communication apparatus 200 and wireless communication apparatus 300.

In the following description, an assumption is made that communication carried out among wireless communication apparatuses 100, 200 and 300 is carried out via a communication section of each apparatus, and the description "via the communication section" will be omitted.

In step S100, operation section 10 receives a connection start request operation for requesting a start of connection between wireless communication apparatus 100 and the other wireless communication apparatus from the user. Thus, connection starting section 141 of calculation section 14 reads apparatus information 131 and setting information 132 from storage section 13. Connection starting section 141 outputs apparatus information 131 to device searching section 142 and outputs setting information 132 to connection control section 146.

In step S200, operation section 20 receives a connection start request operation for requesting a start of connection between wireless communication apparatus 200 and the other wireless communication apparatus from the user. Thus, connection starting section 241 of calculation section 24 reads apparatus information 231 and setting information 232 from storage section 23. Connection starting section 241 outputs apparatus information 231 to device searching section 242 and outputs setting information 232 to connection control section 246.

The user operations in steps S100 and 200 follow the following procedure, for example. First, the user places wireless communication apparatuses 100, 200 and 300 so as to face each other to be able to wirelessly communicate with each other. Next, the user starts an application to carry out WiGig communication in wireless communication apparatuses 100 and 200. The user then selects a menu to start a WiGig communication device and software from a setting screen of the started application in wireless communication apparatuses 100 and 200. Wireless communication apparatuses 100 and 200 are thus instructed to make a connection using WiGig communication and generate the aforementioned connection start request. The above application may be started by only one of wireless communication apparatuses 100 and 200.

Upon receiving apparatus information 131 from connection starting section 141 in step S101, device searching section 142 starts searching for another wireless communication apparatus located in the periphery.

That is, device searching section 142 generates a frame (e.g., search beacon, Probe Request) including identification information of wireless communication apparatus 100 included in apparatus information 131.

Next, device searching section 142 transmits the generated frame to wireless communication apparatus 200. Device searching section 142 receives the frame (e.g., search beacon, Probe Response) generated by wireless communication apparatus 200. This frame includes identification information of wireless communication apparatus 200.

In step S201, upon receiving device apparatus information 231 from connection starting section 241, search section 242 starts searching for another wireless communication apparatus located in the periphery.

That is, device searching section 242 generates a frames (e.g., search beacon, Probe Request) including identification information of wireless communication apparatus 200 included in apparatus information 231.

Next, device searching section 242 transmits the generated frame to wireless communication apparatus 100. Device searching section 242 also receives a frame (e.g., search beacon, Probe Response) generated by wireless communication apparatus 100. This frame includes identification information of wireless communication apparatus 100.

In step S102, upon succeeding in the search for wireless communication apparatus 200 (an example of the found apparatus), device searching section 142 transmits a start indication to wireless communication apparatus 200. After that, device searching section 142 receives a response message in response to the transmitted start indication from wireless communication apparatus 200.

Upon receiving the start indication from wireless communication apparatus 200, device searching section 142 transmits a response message in response thereto to wireless communication apparatus 200.

Device searching section 142 confirms, based on usage information 133 of storage section 13, whether or not wireless communication apparatus 100 has already been connected to the other wireless communication apparatus (other than wireless communication apparatus 200), in other words, whether or not there is any apparatus connected to wireless communication apparatus 100. Since the confirmation result shows that wireless communication apparatus 100 is connected to none of the wireless communication apparatuses (that is, there is no apparatus connected to wireless communication apparatus 100), device searching section 142 will not further transmit any start indication.

Device searching section 142 outputs a capability information acquiring instruction to capability information acquiring section 143.

In step S102, prior to transmission/reception of the start indication, device searching section 142 may determine roles of wireless communication apparatus 100 and wireless communication apparatus 200 that has been successfully found (determine which apparatus corresponds to PCP and which apparatus corresponds to STA).

In step S202, upon succeeding in the search for wireless communication apparatus 100, device searching section 242 transmits a start indication to wireless communication apparatus 100 (an example of the found apparatus). After that, device searching section 242 receives a response message in response to the transmitted start indication from wireless communication apparatus 100.

Upon receiving the start indication from wireless communication apparatus 100, device searching section 242 transmits a response message to wireless communication apparatus 100.

Device searching section 242 confirms, based on usage information 233 of storage section 23, whether or not wireless communication apparatus 200 is connected to another wireless communication apparatus (other than wireless communication apparatus 100), in other words, whether or not there is any apparatus connected to wireless communication apparatus 200. When the confirmation result shows that wireless communication apparatus 200 is connected to wireless communication apparatus 300 (that is, there is an apparatus connected to wireless communication apparatus 200), device searching section 242 transmits a start indication to wireless communication apparatus 300 which is the connected apparatus. Device searching section 242 receives a response message in response to the transmitted start indication from wireless communication apparatus 300.

Device searching section 242 outputs a capability information acquiring instruction to capability information acquiring section 243.

In step S202, prior to transmission/reception of the start indication, device searching section 242 may determine roles of wireless communication apparatus 200 and wireless communication apparatus 100 that has been successfully found (determine which corresponds to PCP and which corresponds to STA).

In step S302, device searching section 342 receives the start indication from wireless communication apparatus 200 which is the connected apparatus and transmits a response message in response thereto to wireless communication apparatus 200.

Device searching section 342 outputs a capability information acquiring instruction to capability information acquiring section 343.

In step S103, upon receiving the capability information acquiring instruction from device searching section 142, capability information acquiring section 143 acquires capability information.

That is, capability information acquiring section 143 transmits a capability information request to wireless communication apparatus 200 which is the found apparatus.

Capability information acquiring section 143 receives capability information of wireless communication apparatus 200 (capability information extracted from apparatus information 231) and capability information of wireless communication apparatus 300 (capability information extracted from apparatus information 331) from wireless communication apparatus 200. Here, the received information here is acquired capability information acquired by wireless communication apparatus 100.

Upon receiving a capability information request from wireless communication apparatus 200, capability information acquiring section 143 reads apparatus information 131 from storage section 13, extracts capability information and transmits the capability information to wireless communication apparatus 200. The information transmitted here is held capability information held by wireless communication apparatus 100.

Capability information acquiring section 143 outputs the acquired capability information and held capability information to connection method determining section 145. Capability information acquiring section 143 outputs a usage information acquiring instruction to usage information acquiring section 144.

In step S203, upon receiving the capability information acquiring instruction from device searching section 242, capability information acquiring section 243 acquires capability information.

That is, capability information acquiring section 243 transmits a capability information request to wireless communication apparatus 100 which is the found apparatus and wireless communication apparatus 300 which is the connected apparatus.

Capability information acquiring section 243 receives capability information of wireless communication apparatus 100 (capability information extracted from apparatus information 131) and capability information of wireless communication apparatus 300 from wireless communication apparatuses 100 and 300 respectively. Here, the received information is the acquired capability information acquired by wireless communication apparatus 200.

Upon receiving the capability information requests from wireless communication apparatuses 100 and 300 respectively, capability information acquiring section 243 reads apparatus information 231 from storage section 23, extracts capability information and transmits the capability information to wireless communication apparatuses 100 and 300 respectively. The information transmitted here is the held capability information held by wireless communication apparatus 200.

Furthermore, capability information acquiring section 243 transmits the capability information of wireless communication apparatus 300 which is the connected apparatus received from wireless communication apparatus 300 to wireless communication apparatus 100. Capability information acquiring section 243 transmits the capability information of wireless communication apparatus 100 which is the found apparatus received from wireless communication apparatus 100 to wireless communication apparatus 300.

Capability information acquiring section 243 outputs the acquired capability information and held capability information to connection method determining section 245. Capability information acquiring section 243 outputs a usage information acquiring instruction to usage information acquiring section 244.

In step S303, upon receiving the capability information acquiring instruction from device searching section 342, capability information acquiring section 343 acquires capability information.

That is, capability information acquiring section 343 transmits a capability information request to wireless communication apparatus 200 which is the connected apparatus.

After that, capability information acquiring section 343 receives the capability information of wireless communication apparatus 200 and the capability information of wireless communication apparatus 100 from wireless communication apparatus 200. The information received here is the acquired capability information acquired by wireless communication apparatus 300.

Upon receiving the capability information request from wireless communication apparatus 200, capability information acquiring section 343 reads apparatus information 331 from storage section 33, extracts capability information and transmits the capability information to wireless communication apparatus 200. The information transmitted here is held capability information held by wireless communication apparatus 300.

Capability information acquiring section 343 outputs the acquired capability information and held capability information to connection method determining section 345. Capability information acquiring section 343 outputs a usage information acquiring instruction to usage information acquiring section 344.

In step S104, upon receiving the usage information acquiring instruction from capability information acquiring section 143, usage information acquiring section 144 acquires usage information.

That is, usage information acquiring section 144 transmits a usage information request to wireless communication apparatus 200 which is the found apparatus.

Usage information acquiring section 144 receives usage information 233 from wireless communication apparatus 200. The information received here is acquired usage information acquired by wireless communication apparatus 100.

Upon receiving the usage information request from wireless communication apparatus 200, usage information acquiring section 144 confirms whether or not usage information 133 is saved in storage section 13. The confirmation result shows that no usage information 133 is saved in storage section 13, so that usage information acquiring section 144 generates a response message indicating that there is no usage information 133 and transmits the response message to wireless communication apparatus 200.

Usage information acquiring section 144 outputs the acquired usage information and a connection method determination instruction to connection method determining section 145.

In step S204, upon receiving a usage information acquiring instruction from capability information acquiring section 243, usage information acquiring section 244 acquires usage information.

That is, usage information acquiring section 244 transmits a usage information request to wireless communication apparatus 100 which is the found apparatus.

Usage information acquiring section 244 receives a response message indicating that there is no usage information 133 from wireless communication apparatus 100.

Upon receiving a usage information request from wireless communication apparatus 100, usage information acquiring section 244 confirms whether or not usage information 233 is saved in storage section 23. The confirmation result shows that usage information 233 is saved in storage section 23, so that usage information acquiring section 244 reads usage information 233 and transmits usage information 233 to wireless communication apparatus 100. The information transmitted here is held usage information held by wireless communication apparatus 200.

Usage information acquiring section 244 outputs the held usage information and a connection method determination instruction to connection method determining section 245.

In step S304, upon receiving the usage information acquiring instruction from capability information acquiring section 343, usage information acquiring section 344 acquires usage information.

However, since there is no found apparatus for wireless communication apparatus 300, usage information acquiring section 344 does not transmit any usage information request. Usage information acquiring section 344 reads usage information 333 of wireless communication apparatus 300 from storage section 33. The information read here is held usage information held by wireless communication apparatus 300.

Usage information acquiring section 344 outputs the held usage information and a connection method determination instruction to connection method determining section 345.

In step S105, upon receiving the connection method determination instruction from usage information acquiring section 144, connection method determining section 145 determines a connection method. The connection method is determined based on the capability information (held capability information and acquired capability information) from capability information acquiring section 143 and usage information (acquired usage information) from usage information acquiring section 144. Connection method determining sections 245 and 345 also determine the connection method likewise (steps S205 and S305). In this determination of the connection method, it is determined in what roles wireless communication apparatus 100 and the other wireless communication apparatus are connected. As specific examples of determining the connection method, determination examples 1 to 3 will be described.

<Determination Example 1>

An assumption is made that each capability information item has the followings contents, for example.

Capability information of wireless communication apparatus 100: multirole "Disabled," connection method "PCP-STA, STA-STA"

Capability information of wireless communication apparatus 200: multirole "Disabled," connection method "PCP-STA"

Capability information of wireless communication apparatus 300: multirole "Disabled," connection method "PCP-STA, STA-STA"

Meanwhile, usage information has the followings contents, for example.

Usage information of wireless communication apparatuses 200 and 300: connected communication channel "apparatus 200—apparatus 300," usage "In use"

In the above cases, connection method determining section 145 makes determinations as follows.

First, connection method determining section 145 determines in the usage information, whether or not a connected communication channel is in use. When the determination result shows that the connected communication channel is in use, connection method determining section 145 determines that the connection of the connected communication channel is maintained. On the other hand, when the determination result shows that the connected communication channel is not in use, connection method determining section 145 determines that the connected communication channel will be disconnected. Similar determinations are applied to determination examples 2 and 3 which will be described later.

Since the usage of connected communication channel "apparatus 200—apparatus 300" in the usage information is "In use," connection method determining section 145 determines that the connection of wireless communication apparatus 200 as a PCP and wireless communication apparatus 300 as an STA will be maintained.

Next, connection method determining section 145 determines in what roles wireless communication apparatus 200 and wireless communication apparatus 100 are respectively connected based on contents common to the capability information of wireless communication apparatus 100 and the capability information of wireless communication apparatus 200. The determination results based on the above usage information are also used in this determination. Similar determinations are applied to determination examples 2 and 3 which will be described later.

Here, connection method determining section 145 determines that the connection between communication apparatus 200 (PCP) and wireless communication apparatus 300 (STA) will be maintained and multirole of wireless communication apparatus 200 is "Disabled." Therefore, connection method determining section 145 determines that wireless communication apparatus 200 is a PCP. Since only "PCP-STA" connection is possible for wireless communication apparatus 200, connection method determining section 145 determines that wireless communication apparatus 100 is an STA. That is, the connection between wireless communication apparatus 200 and wireless communication apparatus 100 is determined as a PCP-STA connection.

Next, connection method determining section 145 determines in what roles wireless communication apparatus 300 and wireless communication apparatus 100 are respectively connected based on contents common to the capability information of wireless communication apparatus 100 and the capability information of wireless communication apparatus 300. In this determination, determination results based on the above usage information are also used. Similar determinations are applied to determination examples 2 and 3 which will be described later.

Here, connection method determining section 145 determines that the connection between wireless communication apparatus 200 (PCP) and wireless communication apparatus 300 (STA) will be maintained and multirole of wireless communication apparatus 300 is "Disabled." Therefore, connection method determining section 145 determines that wireless communication apparatus 300 is an STA. Since the "STA-STA" connection is enabled for both wireless communication apparatuses 100 and 300, connection method determining section 145 determines that wireless communication apparatus 100 is an STA. That is, the connection between wireless communication apparatus 300 and wireless communication apparatus 100 is determined to be an STA-STA connection.

In this way, connection method determining section 145 obtains following determination result 1.

Wireless communication apparatus 200—wireless communication apparatus 100: PCP-STA (new connection)

Wireless communication apparatus 200—wireless communication apparatus 300: PCP-STA (connection maintained)

Wireless communication apparatus 300—wireless communication apparatus 100: STA-STA (new connection)

<Determination Example 2>

Each capability information item has the followings contents, for example.

Capability information of wireless communication apparatus 100: multirole "Enabled," connection method "PCP-STA, STA-STA"

Capability information of wireless communication apparatus 200: multirole "Disabled," connection method "PCP-STA"

Capability information of wireless communication apparatus 300: multirole "Enabled," connection method "PCP-STA"

Meanwhile, usage information has the followings contents, for example.

Usage information of wireless communication apparatuses 200 and 300: connected communication channel "apparatus 200—apparatus 300," usage "In use"

In the above cases, connection method determining section 145 makes determinations as follows.

First, connection method determining section 145 makes determinations based on the usage information as described above. That is, since usage of connected communication channel "apparatus 200—apparatus 300" is "In use," connection method determining section 145 determines that the connection of wireless communication apparatus 200 as a PCP and the connection of wireless communication apparatus 300 as an STA will be maintained.

Next, connection method determining section 145 makes determinations based on the capability information of wireless communication apparatus 100 and the capability information of wireless communication apparatus 200 as described above. That is, connection method determining section 145 determines that the connection between wireless communication apparatus 200 (PCP) and wireless communication apparatus 300 (STA) will be maintained and multirole of wireless communication apparatus 200 is "Disabled." Thus, connection method determining section 145 determines that wireless communication apparatus 200 is a PCP. Since only a "PCP-STA" connection is enabled for wireless communication apparatus 200, connection method determining section 145 determines that wireless communication apparatus 100 is an STA. That is, connection method determining section 145 determines that the connection between wireless communication apparatus 200 and wireless communication apparatus 100 is a PCP-STA connection.

Next, connection method determining section 145 makes determinations based on the capability information of wireless communication apparatus 100 and the capability information of wireless communication apparatus 300 as described above. That is, connection method determining section 145 determines that the connection between wireless communication apparatus 200 (PCP) and wireless communication apparatus 300 (STA) will be maintained and multirole of wireless communication apparatus 300 is "Enabled" and only a "PCP-STA" connection is enabled. For this reason, connection method determining section 145 determines that wireless communication apparatus 300 is a PCP and wireless communication apparatus 100 is an STA. That is, connection method determining section 145 determines that the connection between wireless communication apparatus 300 and wireless communication apparatus 100 is a PCP-STA connection.

In this way, connection method determining section 145 obtains following determination result 2.

Wireless communication apparatus 200—wireless communication apparatus 100: PCP-STA (new connection)

Wireless communication apparatus 200—wireless communication apparatus 300: PCP-STA (connection maintained)

Wireless communication apparatus 300—wireless communication apparatus 100: PCP-STA (new connection)

<Determination Example 3>

An assumption is made that each capability information item has the following contents, for example.

Capability information of wireless communication apparatus 100: multirole "Enabled," connection method "PCP-STA, STA-STA"

Capability information of wireless communication apparatus 200: multirole "Disabled," connection method "PCP-STA"

Capability information of wireless communication apparatus 300: multirole "Enabled," connection method "PCP-STA"

Furthermore, the usage information has the following contents, for example.

Usage information of wireless communication apparatuses 200 and 300: connected communication channel "apparatus 200—apparatus 300," usage "not in use"

In the above cases, connection method determining section 145 makes the following determinations.

First, connection method determining section 145 makes determinations based on usage information as described above. That is, since the usage of connected communication channel "apparatus 200—apparatus 300" is "Not in use," connection method determining section 145 determines that the connection between wireless communication apparatus 200 as a PCP and wireless communication apparatus 300 as an STA will be disconnected.

Next, connection method determining section 145 makes determinations based on the capability information of wireless communication apparatus 100 and the capability information of wireless communication apparatus 200 as described above. That is, since multirole of wireless communication apparatus 200 is "Disabled" and only a "PCP-STA" connection is enabled, connection method determining section 145 determines that wireless communication apparatus 200 is a PCP and wireless communication apparatus 100 is an STA. That is, connection method determining section 145 determines that the connection between wireless communication apparatus 200 and wireless communication apparatus 100 is a PCP-STA connection. Note that connection method determining section 145 may also determine that wireless communication apparatus 100 is a PCP and wireless communication apparatus 200 is an STA. Suppose that the determination as to which wireless communication apparatus becomes a PCP follows the results of role determinations made during a device search (S101 and S102 in FIG. 3).

Next, connection method determining section 145 makes determinations based on the capability information of wireless communication apparatus 100 and the capability information of wireless communication apparatus 300 as described above. That is, connection method determining section 145 determines that wireless communication apparatus 200 (PCP) and wireless communication apparatus 100 (STA) will be connected and multirole of wireless communication apparatus 300 is "Enabled" and only a "PCP-STA" connection is enabled. On the other hand, multirole of wireless communication apparatus 100 is "Enabled" and an "STA-STA" connection is also enabled. Thus, connection method determining section 145 determines that wireless communication apparatus 300 is a PCP and wireless communication apparatus 100 is an STA. That is, connection method determining section 145 determines that the connection between wireless communication apparatus 300 and wireless communication apparatus 100 is a PCP-STA connection.

In this way, connection method determining section 145 obtains following determination result 3.

Wireless communication apparatus 200—wireless communication apparatus 100: PCP-STA (new connection)
 Wireless communication apparatus 200—wireless communication apparatus 300: (disconnected)
 Wireless communication apparatus 300—wireless communication apparatus 100: PCP-STA (new connection)

Determination examples 1 to 3 have been described so far. Note that determinations made by connection method determining section 145 are not limited to determination examples 1 to 3. Determination results in determination examples 1 to 3 are not limited to determination results 1 to 3.

Connection method determining section 145 generates connection method information indicating determination results and transmits the results to wireless communication apparatus 200.

Upon receiving the connection method information generated by wireless communication apparatus 200 from wireless communication apparatus 200, connection method determining section 145 confirms whether the received connection method information (an example of acquired connection method information) matches the connection method information (an example of generated connection method information) generated by wireless communication apparatus 100.

When the above confirmation result shows that the acquired connection method information matches the generated connection method information, connection method determining section 145 transmits match information indicating the match to wireless communication apparatus 200.

On the other hand, when the above confirmation result shows that the acquired connection method information does not match the generated connection method information, connection method determining section 145 transmits mismatch information indicating the mismatch to wireless communication apparatus 200.

Upon receiving the match information from wireless communication apparatus 200, connection method determining section 145 outputs the generated connection method information and a connection control instruction to connection control section 146.

On the other hand, upon receiving mismatch information from wireless communication apparatus 200, connection method determining section 145 does not output the generated connection method information and the connection control instruction and outputs information indicating that connections with wireless communication apparatuses 200 and 300 are not possible to display section 11. In this way, information indicating that wireless communication apparatus 100 cannot be connected to wireless communication apparatuses 200 and 300 is displayed on display section 11.

Upon receiving a connection method determination instruction from usage information acquiring section 244, connection method determining section 245 determines the connection method as in the case of aforementioned connection method determining section 145. Specific examples of determining the connection method are the same as those of aforementioned determination examples 1 to 3 and description thereof will be omitted here.

Connection method determining section 245 generates connection method information indicating the determination results and transmits the connection method information to wireless communication apparatuses 100 and 300.

Connection method determining section 245 receives connection method information generated by each wireless communication apparatus from wireless communication apparatuses 100 and 300. Connection method determining section 245 then confirms whether or not each received connection method information item (an example of acquired connection method information) matches the connection method information (an example of generated connection method information) generated by wireless communication apparatus 200.

When the above confirmation result shows that the acquired connection method information matches the generated connection method information, connection method determining section 245 transmits match information indicating the match to wireless communication apparatus 100 or 300 which is the sender of the matched acquired connection method information.

On the other hand, when the above confirmation result shows that the acquired connection method information does not match the generated connection method information, connection method determining section 245 transmits mismatch information indicating the mismatch to wireless communication apparatus 100 or 300 which is the sender of mismatched acquired connection method information.

Upon receiving match information from both wireless communication apparatuses 100 and 300, connection method determining section 245 outputs the generated connection method information and a connection control instruction to connection control section 246.

On the other hand, upon receiving mismatch information from at least one of wireless communication apparatuses 100 and 300, connection method determining section 245 outputs neither the generated connection method information nor the connection control instruction and outputs information indicating that a connection with wireless communication apparatus 100 is not possible to display section 21. This causes information indicating that wireless communication apparatus 200 cannot be connected to wireless communication apparatus 100 to be displayed on display section 21.

Upon receiving a connection method determination instruction from usage information acquiring section 344, connection method determining section 345 determines the connection method as in the case of aforementioned connection method determining section 145. Specific examples of determining the connection method are the same as those of aforementioned determination examples 1 to 3, and description thereof will be omitted here.

Connection method determining section 345 generates connection method information indicating the determination result and transmits the information to wireless communication apparatus 200.

Upon receiving the connection method information generated by wireless communication apparatus 200 from wireless communication apparatus 200, connection method determining section 345 confirms whether or not each received connection method information item (an example of the acquired connection method information) matches the connection method information (an example of the generated connection method information) generated by wireless communication apparatus 300.

When the confirmation result shows that the acquired connection method information matches the generated connection method information, connection method determining section 345 transmits match information indicating the match to wireless communication apparatus 200.

On the other hand, when the confirmation result shows that the acquired connection method information does not match the generated connection method information, connection method determining section 345 transmits mismatch information indicating the mismatch to wireless communication apparatus 200.

Upon receiving the match information from wireless communication apparatus 200, connection method determining section 345 outputs the generated connection method information and a connection control instruction to connection control section 346.

On the other hand, upon receiving the mismatch information from wireless communication apparatus 200, connection method determining section 345 outputs neither the generated connection method information nor any connection control instruction and outputs, for example, information indicating that no connection is possible to wireless communication apparatus 100 to display section 31. In this way, information indicating that wireless communication apparatus 300 cannot be connected to wireless communication apparatus 100 is displayed on display section 31.

In step S106, upon receiving the connection control instruction from connection method determining section 145, connection control section 146 communicates with wireless communication apparatuses 200 and 300 in order to perform control for establishing the connection indicated by the generated connection method information from connection method determining section 145. That is, connection control section 146 executes WPA using setting information 132 from device searching section 142. This causes wireless communication apparatus 100 and wireless communication apparatuses 200 and 300 to be connected in a connection pattern indicated by the generated connection method information and WiGig communication becomes possible. In response to communication with wireless communication apparatus 100, connection control section 246 and connection control section 346 also execute WPA (steps S206 and S306).

Figure 5:
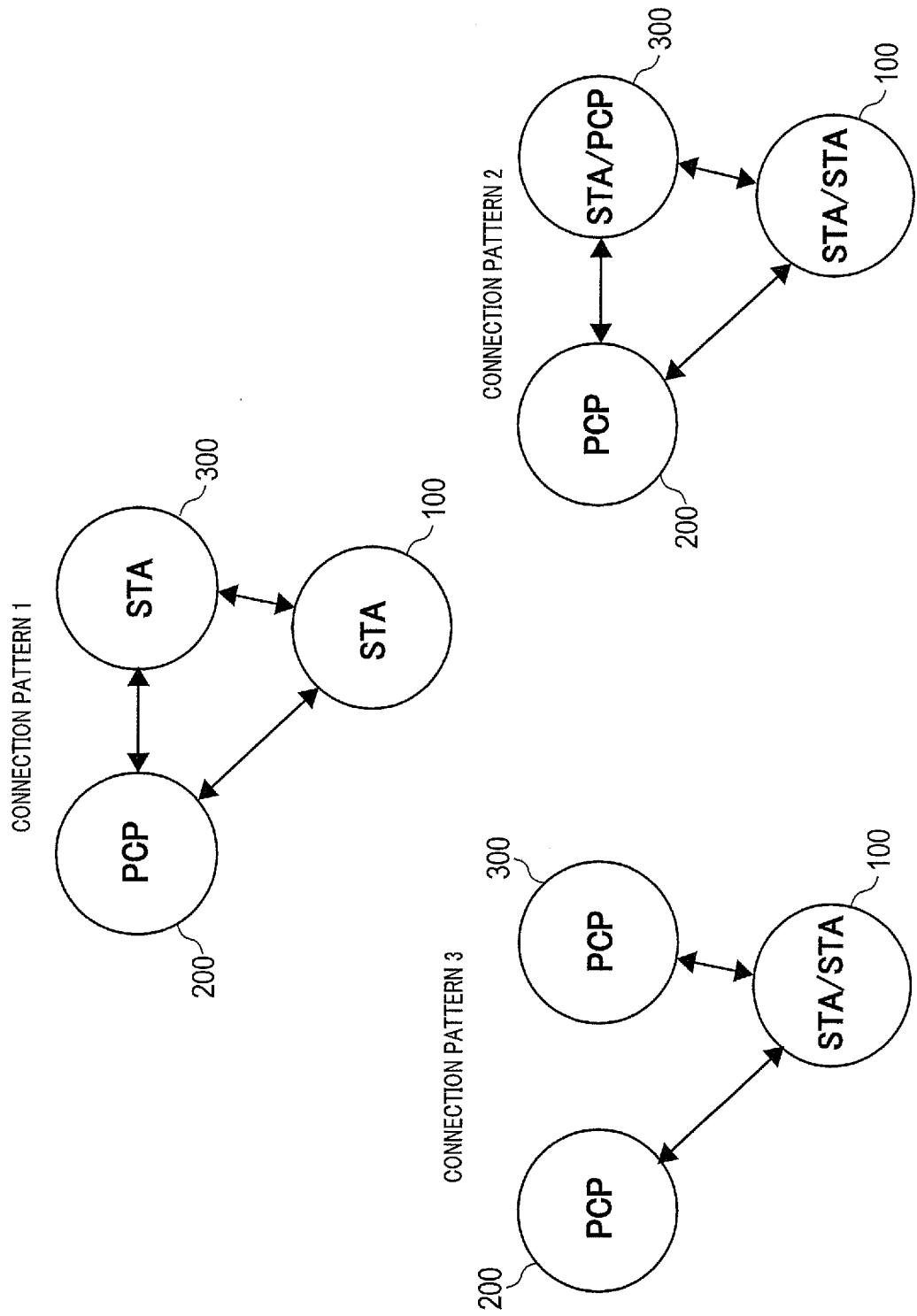
FIG. 5 is a diagram illustrating an example of a connection pattern of the wireless communication apparatus according to the present embodiment.

For example, when the generated connection method information indicates above determination result 1, the following control is performed. That is, connection control section 146 performs control so as to maintain a PCP-STA connection between wireless communication apparatus 200 and wireless communication apparatus 300. Connection control section 146 performs control so as to newly establish a PCP-STA connection between wireless communication apparatus 200 and wireless communication apparatus 100. Furthermore, connection control section 146 performs control so as to newly establish an STA-STA connection between wireless communication apparatus 300 and wireless communication apparatus 100. As a result, wireless communication apparatuses 100, 200 and 300 are connected in connection pattern 1 shown in FIG. 5.

On the other hand, for example, when the generated connection method information indicates above determination result 2, the following control is performed. That is, connection control section 146 performs control so as to maintain a PCP-STA connection between wireless communication apparatus 200 and wireless communication apparatus 300. Connection control section 146 performs control so as to newly establish a PCP-STA connection between wireless communication apparatus 200 and wireless communication apparatus 100. Furthermore, connection control section 146 performs control so as to newly establish a PCP-STA connection between wireless communication apparatus 300 and wireless communication apparatus 100. As a result, wireless communication apparatuses 100, 200 and 300 are connected in connection pattern 2 shown in FIG. 5.

On the other hand, for example, when the generated connection method information indicates above determination result 3, the following control is performed. That is, connection control section 146 performs control so as to disconnect a PCP-STA connection between wireless communication apparatus 200 and wireless communication apparatus 300.

Connection control section 146 performs control so as to newly establish a PCP-STA connection between wireless communication apparatus 200 and wireless communication apparatus 100. Furthermore, connection control section 146 performs control so as to newly establish a PCP-STA connection between wireless communication apparatus 300 and wireless communication apparatus 100. As a result, wireless communication apparatuses 100, 200 and 300 are connected in connection pattern 3 shown in FIG. 5.

In the above embodiment, each wireless communication apparatus determines a connection method based on both capability information and usage information, but it is also possible to determine a connection method based on only capability information without using usage information. In that case, since a plurality of determination results are expected, it is preferable to predetermine determination results that should be given priority. For example, when a determination result that both "PCP-STA connection" and "STA-STA connection" are possible is expected for the connection between wireless communication apparatuses 100 and 300, the adoption of "STA-STA connection" may be predetermined as the determination result.

The capability information is not limited to the description of the above embodiment. For example, the capability information may include information indicating whether or not to adopt a bridge connection (a connection whereby a plurality of STAs can communicate via a PCP). For example, the capability information may include information on a support rate per channel. The support rate per channel is a maximum communicable rate expressed by a rate such as bps (bits per second) for each channel such as STA-STA, PCP-STA or STA-PCP-STA. In addition, for example, the capability information may include information as the indication for power consumption as the information used to determine a connection method with lower power consumption. The capability information may also include information on, for example, a distance, communicable angle or range of intensity of radio wave which becomes the indication for a communicable range. Use of the capability information described above allows the wireless communication apparatus to determine an optimum connection method according to the purpose.

Wireless communication apparatuses may also determine their connection methods using information defined in the standard as the capability information. For example, wireless communication apparatuses may give priority to a connection method between apparatuses having a large maximum number of connections so that when the number of apparatuses to be connected increases later, the number of processes may be reduced or control may be performed so as to make new connections more easily. Wireless communication apparatuses may also give priority to connection methods compatible with multiband such as 60 GHz or 5 GHz to determine roles or the like. In this case, wireless communication apparatuses may establish a PCP-STA connection and a 5 GHz connection between two apparatuses so that communication is less interrupted or so as to give priority to connection methods having an increased range of data communication functions. The data communication functions refer to, for example, IP communication functions, video transmission functions or communication functions as wireless USB.

As described above, the wireless communication apparatus of the present embodiment has a feature of determining, when carrying out WiGig communication, in what roles each apparatus is connected based on capability information of the wireless communication apparatus and capability information of a connection peer. This allows appropriate connections to be made by taking into account wireless communication capability held by each wireless communication apparatus.

<Variations of Embodiment>

The present embodiment has been described so far, but the above embodiment is an example, and various modifications are possible. Hereinafter, variations will be described.

Figure 6:
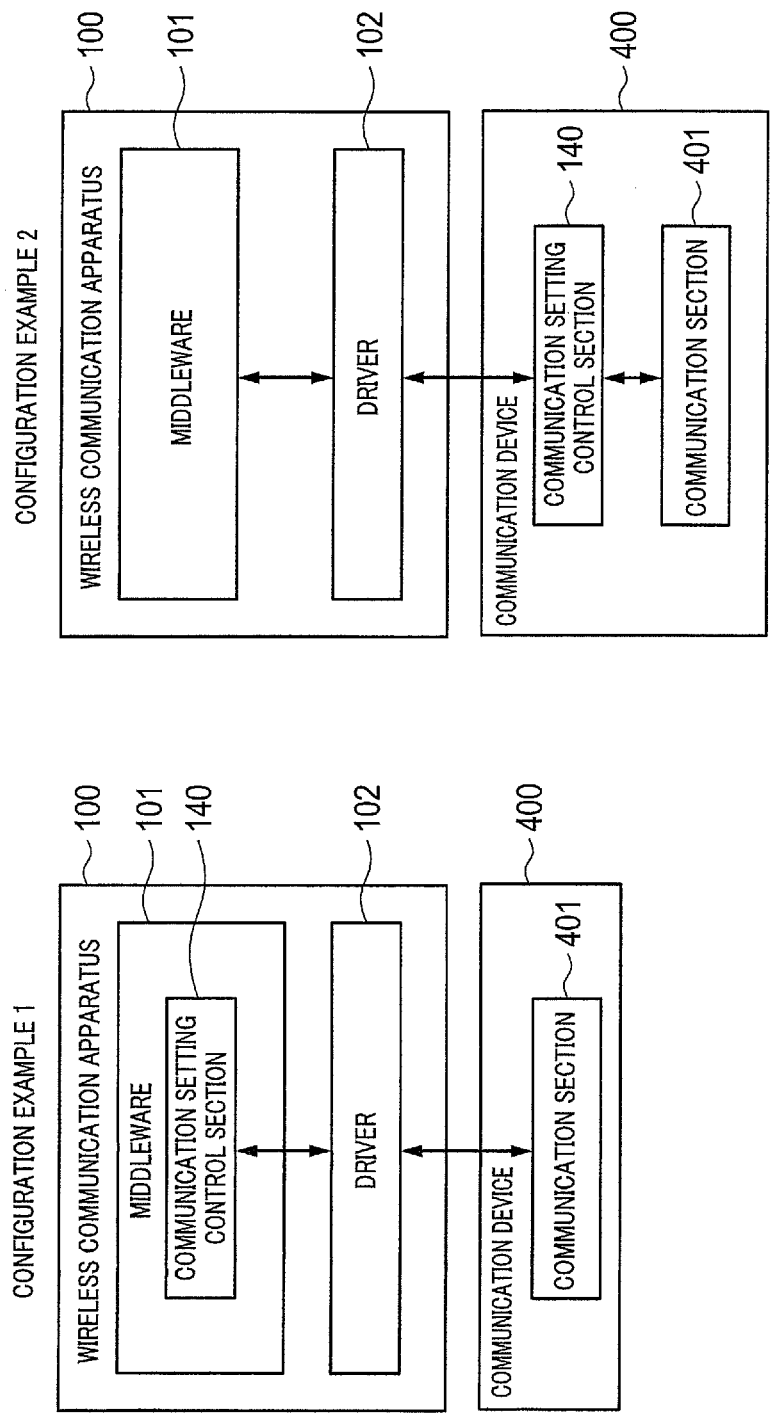
FIG. 6 is a diagram illustrating a configuration example using software according to the present embodiment.

Variation 1 will be described. Although a case has been described in the above embodiment where the present disclosure is configured with hardware by way of example, the disclosure may also be implemented by software in cooperation with hardware. FIG. 6 illustrates this configuration example. Although a case will be described below by taking wireless communication apparatus 100 as an example, the configuration in FIG. 6 is also applicable to wireless communication apparatuses 200 and 300.

Configuration example 1 in FIG. 6 is a configuration in which wireless communication apparatus 100 is connectable to communication device 400 with which wireless communication apparatus 100 can perform WiGig communication. Wireless communication apparatus 100 is provided with middleware 101 and driver 102, and middleware 101 is provided with communication setting control section 140. This communication setting control section 140 includes the sections provided for calculation section 14 shown in FIG. 1. That is, in configuration example 1, the respective sections of calculation section 14 are implemented as middleware 101. Communication setting control section 140 controls communication section 401 of communication device 400 via driver 102 and performs WiGig communication. Note that middleware 101 may be an application. Communication setting control section 140 may be provided in driver 102.

Configuration example 2 in FIG. 6 is a configuration in which wireless communication apparatus 100 is connectable to communication device 400 with which wireless communication apparatus 100 can perform WiGig communication. However, configuration example 2 is different from configuration example 1 in that communication setting control section 140 is provided on the communication device 400 side. Communication setting control section 140 receives a request from middleware 101 via driver 102, controls communication section 401 and performs WiGig communication. Note that middleware 101 may be an application.

Variation 2 will be described. In the above embodiment, an example has been described where all wireless communication apparatuses 100, 200 and 300 determine connection methods, but the present disclosure is not limited to this. For example, only wireless communication apparatuses 100 and 200 that have conducted a device search may determine connection methods. In this case, wireless communication apparatus 200 which is a PCP transmits connection method information generated by wireless communication apparatus 200 to wireless communication apparatus 300 and wireless communication apparatus 300 makes a connection based on the received connection method information. Alternatively, only wireless communication apparatus 200 which is a PCP may determine a connection method. In this case, wireless communication apparatus 200 which is a PCP transmits connection method information generated by wireless communication apparatus 200 to wireless communication apparatuses 100 and 300, and wireless communication apparatuses 100 and 300 make connections based on the received connection method information.

Variation 3 will be described. An example has been described in the above embodiment where capability information and usage information are acquired in a single step (S103, S203, S303 and S104, S204, S304), but the present disclosure is not limited to this. For example, capability information and usage information may be acquired using a beacon or probe message in the device search step (S101, S201).

Variation 4 will be described. In the above embodiment, an example has been described where connections are made among three wireless communication apparatuses, but the present disclosure is not limited to this. For example, the flow in FIG. 3 is also effective for a connection between two wireless communication apparatuses (e.g., a connection between wireless communication apparatus 100 and wireless communication apparatus 200). Alternatively, the flow in FIG. 3 is also effective for connections among four or more wireless communication apparatuses.

Variation 5 will be described. In the above embodiment, a connection method may be determined so as to reflect the user's desire. For example, in the state in FIG. 4, when the user desires only a connection between wireless communication apparatuses 100 and 300, each connection method determining section may operate as follows. That is, each connection method determining section may acquire information indicating the user's desire (connection of only apparatus 100—apparatus 300) from the operation section in addition to capability information and usage information, and determine a connection method based on all the information items. This makes it possible to realize a connection that meets the user's desire and eliminate the need for the user to make unnecessary connections.

As described above, a wireless communication apparatus of this disclosure is a wireless communication apparatus that performs communication using WiGig, the wireless communication apparatus including: a storage section that stores capability information indicating wireless communication capability of the wireless communication apparatus which is referred to as a first wireless communication apparatus; a capability information acquiring section that acquires capability information of a second wireless communication apparatus which is a connection peer of the first wireless communication apparatus from the second wireless communication apparatus; and a connection method determining section that determines a role of each of the first and the second wireless communication apparatuses when the first and the second wireless communication apparatuses are connected, based on the capability information of the first wireless communication apparatus and the capability information of the second wireless communication apparatus.

In the wireless communication apparatus of this disclosure, the capability information indicates whether or not the wireless communication apparatus storing the capability information can operate in a plurality of roles simultaneously and indicates a role of each of the wireless communication apparatus and the connection peer of the wireless communication apparatus when the wireless communication apparatus is connected to the connection peer of the wireless communication apparatus.

In the wireless communication apparatus of the present disclosure: the capability information acquiring section acquires, when the second wireless communication apparatus is already connected to a third wireless communication apparatus, capability information of the third wireless communication apparatus, and the connection method determining section determines a role of each of the first, the second and the third wireless communication apparatuses when the first, the second and the third wireless communication apparatuses are connected, based on the capability information of the first, the second and the third wireless communication apparatuses.

The wireless communication apparatus of this disclosure further includes a usage information acquiring section that acquires usage information indicating whether or not a connected communication channel between the second and the third wireless communication apparatuses is in use, in which the connection method determining section determines a role of each of the first, the second and the third wireless communication apparatuses when the first, the second and the third wireless communication apparatuses are connected, based on the usage information, the capability information of the first, the second and the third wireless communication apparatuses.

Moreover, in the wireless communication apparatus of this disclosure, the connection method determining section makes the determination based on information indicating a user desired connection.

A wireless communication method of the present disclosure is a method of performing communication using WiGig, the method including: storing capability information indicating wireless communication capability of a wireless communication apparatus which is referred to as a first wireless communication apparatus; acquiring capability information of a second wireless communication apparatus which is a connection peer of the first wireless communication apparatus from the second wireless communication apparatus; and determining a role of each of the first and the second wireless communication apparatuses when the first and the second wireless communication apparatuses are connected, based on the capability information of the first wireless communication apparatus and the capability information of the second wireless communication apparatus.

A wireless communication control program of the present disclosure is a program that causes a computer of an apparatus that performs communication using WiGig to execute processing including: storing capability information indicating wireless communication capability of a wireless communication apparatus which is referred to as a first wireless communication apparatus; acquiring capability information of a second wireless communication apparatus which is a connection peer of the first wireless communication apparatus from the second wireless communication apparatus; and determining a role of each of the first and the second wireless communication apparatuses when the first and the second wireless communication apparatuses are connected, based on the capability information of the first wireless communication apparatus and the capability information of the second wireless communication apparatus.

The disclosure of Japanese Patent Application No. 2013-127592, filed on Jun. 18, 2013, including the specification, drawings and abstract is incorporated herein by reference in its entirety.

INDUSTRIAL APPLICABILITY

The present disclosure is suitable for use as a wireless communication apparatus, a wireless communication method, and a wireless communication control program that carry out wireless communication with another wireless communication apparatus.

REFERENCE SIGNS LIST 10, 20, 30 Operation section
11, 21, 31 Display section
12, 22, 32 Communication section
13, 23, 33 Storage section
14, 24, 34 Calculation section
100, 200, 300 Wireless communication apparatus
101 Middleware
102 Driver
131, 231, 331 Apparatus information
132, 232, 332 Setting information
133, 233, 333 Usage information
140 Communication setting control section
141, 241, 341 Connection starting section
142, 242, 342 Device searching section
143, 243, 343 Capability information acquiring section
144, 244, 344 Usage information acquiring section
145, 245, 345 Connection method determining section
146, 246, 346 Connection control section
400 Communication device
401 Communication section

The invention claimed is:

1. A wireless communication apparatus that performs communication using WiGig, the wireless communication apparatus comprising:
  a storage that stores first capability information indicating wireless communication capability of the wireless communication apparatus, which is referred to as a first wireless communication apparatus; and
  a processor, coupled to the storage, wherein the processor, in operation,
    acquires second capability information of a second wireless communication apparatus, which is a connection peer of the first wireless communication apparatus, from the second wireless communication apparatus,
    acquires third capability information of a third wireless communication apparatus, which is a connection peer of the second wireless communication apparatus, from the third wireless communication apparatus,
    acquires usage information indicating whether or not a connected communication channel between the second and the third wireless communication apparatuses is in use, and
    determines a role of each of the first, the second and the third wireless communication apparatuses when the first, the second and the third wireless communication apparatuses are connected, based on the usage information, the first, the second, and the third capability information.

2. The wireless communication apparatus according to claim 1, wherein the role of each of the first, the second and the third wireless communication apparatus is one or both of a Personal basic service set Central Point (PCP) role and a station (STA) role.

* * * * *